(12) United States Patent
Dubeyko et al.

(10) Patent No.: US 12,393,457 B2
(45) Date of Patent: Aug. 19, 2025

(54) DATA PROCESSING USING A HETEROGENEOUS MEMORY POOL

(71) Applicant: Lemon Inc., Grand Cayman (KY)

(72) Inventors: Viacheslav Dubeyko, Los Angeles, CA (US); Jian Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 805 days.

(21) Appl. No.: 17/715,530

(22) Filed: Apr. 7, 2022

(65) Prior Publication Data

US 2023/0325240 A1    Oct. 12, 2023

(51) Int. Cl.
| | |
|---|---|
| *G06F 9/46* | (2006.01) |
| *G06F 9/30* | (2018.01) |
| *G06F 9/50* | (2006.01) |
| *G06F 12/0882* | (2016.01) |

(52) U.S. Cl.
CPC ........ *G06F 9/5016* (2013.01); *G06F 9/30047* (2013.01); *G06F 9/5022* (2013.01); *G06F 12/0882* (2013.01); *G06F 2209/5011* (2013.01)

(58) Field of Classification Search
CPC .. G06F 9/5016; G06F 9/30047; G06F 9/5022; G06F 12/0882; G06F 2209/5011
See application file for complete search history.

*Primary Examiner* — Gregory A Kessler
(74) *Attorney, Agent, or Firm* — BakerHostetler

(57) ABSTRACT

The present disclosure describes techniques for improved data processing. At least one management page may be generated by a host. The at least one management page comprises a plurality of management structures, and the at least one management page defines data instances, algorithms, and a computational environment. Computation may be initiated in a memory pool by performing a write operation of the at least one management page into the memory pool. The memory pool comprises a persistent memory and a plurality of field-programmable gate array (FPGA) cores. The computation in the memory pool comprises parallel data processing by at least a subset of the plurality of FPGA cores.

20 Claims, 12 Drawing Sheets

DATA PROCESSING USING A HETEROGENEOUS MEMORY POOL

BACKGROUND

Companies and/or individuals, increasingly need to process a large quantity of data. Such data may come from a large quantity of data sources. However, the large quantity of available data and/or data sources may make it difficult for the companies and/or individuals to efficiently process the data. For example, data processing tasks may consume a large quantity of computing power and/or a large quantity of time. Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Modern computing paradigms and hardware stacks involve robust architectures that make the foundation of modern-day digital life. However, such paradigms are till-able to provide a stable basis for growth of data processing performance. Big data and the growing volume of computing technology applications have exhausted the potential of the available computing paradigms. More specifically, a large percentage (i.e., about 80%) of machine instructions are generally operations for moving data. Thus, the majority of power consumption is spent not for computation but instead for data/instruction moving between the processing core and memory.

Figure 1:
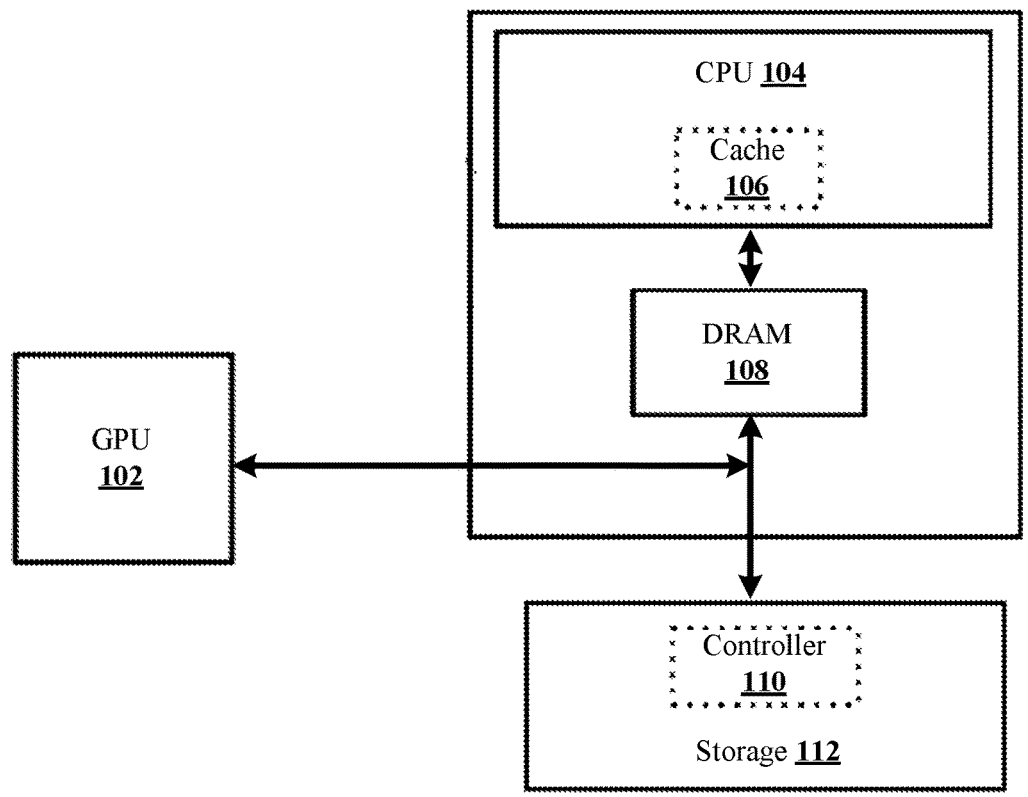
FIG. 1 illustrates a prior art framework for data processing.

FIG. 1 illustrates a prior art framework 100 for data processing. The framework 100 includes a graphics processing unit (GPU) 102, at least one central processing unit (CPU) core 104, a dynamic random-access memory (DRAM) 108, and a storage 112. As used herein, persistent storage refers to any data storage device that retains data after power to that device is shut off. It is also sometimes referred to as non-volatile storage. As used herein, DRAM refers to a type of random-access semiconductor memory that stores each bit of data in a memory cell, usually consisting of a tiny capacitor and a transistor, both typically based on metal-oxide-semiconductor (MOS) technology.

Each of the CPU core(s) 104 include a CPU cache 106. For example, several CPU cores may be included in each CPU socket, and every CPU core may have a dedicated CPU cache. A CPU cache is a hardware cache used by the CPU core 104 to reduce the average cost to access data from the main memory. A cache is a smaller, faster memory, located closer to a processor core, which stores copies of the data from frequently used main memory locations. The CPU cache 106 can improve the data processing performance. However, a drawback to utilizing the CPU cache 106 to improve data processing performance is that the CPU cache 106 may employ complicated cache coherence protocols to achieve a consistent view of data in memory by the CPU core 104. For example, the complication brought on by cache coherence protocols may result from the necessity to achieve a consistent state in DRAM when caches of different CPU cores have their own modified version of some piece of data, as the modifications of the same piece of data need to be synchronized in different caches. Such cache coherence protocols often eliminate any advantages provided by the use of the CPU cache 106 due to core synchronization overhead.

The storage 112 is represented by solid-state drive (SSD) and/or a hard disk drive (HDD) that can store data but cannot process data. An SSD is a solid-state storage device that uses integrated circuit assemblies to store data persistently, typically using flash memory, and functioning as secondary storage in the hierarchy of computer storage. An HDD is an electro-mechanical data storage device that stores and retrieves digital data using magnetic storage and one or more rigid rapidly rotating platters coated with magnetic material. The platters are paired with magnetic heads, usually arranged on a moving actuator arm, which read and write data to the platter surfaces. Data is accessed in a random-access manner, meaning that individual blocks of data can be stored and retrieved in any order.

Thus, data must be moved from the storage 112 into the DRAM 108, with the goal to access and process data by the CPU core 104. However, such movement of data from the storage 112 into the DRAM 108 may result in overhead associated with the controller 110 of the storage 112. Additionally, such movement of data may result in a throughput bottleneck. Such a bottleneck may limit the capacity of the framework 100 to function (i.e., send data) at its optimum level, and may result in clogging of productivity, profitability, and growth. The framework 100 also results in a memory wall problem, as the rate of improvement in the performance of the CPU core 104 far exceeds the rate of improvement in the memory speed of the DRAM 108. Such movement of data may additionally result in a power consumption problem for the GPU 102, as the majority of power consumption is spent not for computation but instead for data/instruction moving between the CPU core 104 and the storage 112.

Persistent memory technologies have become increasingly fast, but modern computing stacks completely eliminate these advantages due to known drawbacks. Thus, new approaches need to be used to improve the performance of data processing in the world of big data that continues to grow every day. In particular, modern computing paradigms need to be improved to achieve a faster data processing performance.

Figure 2:
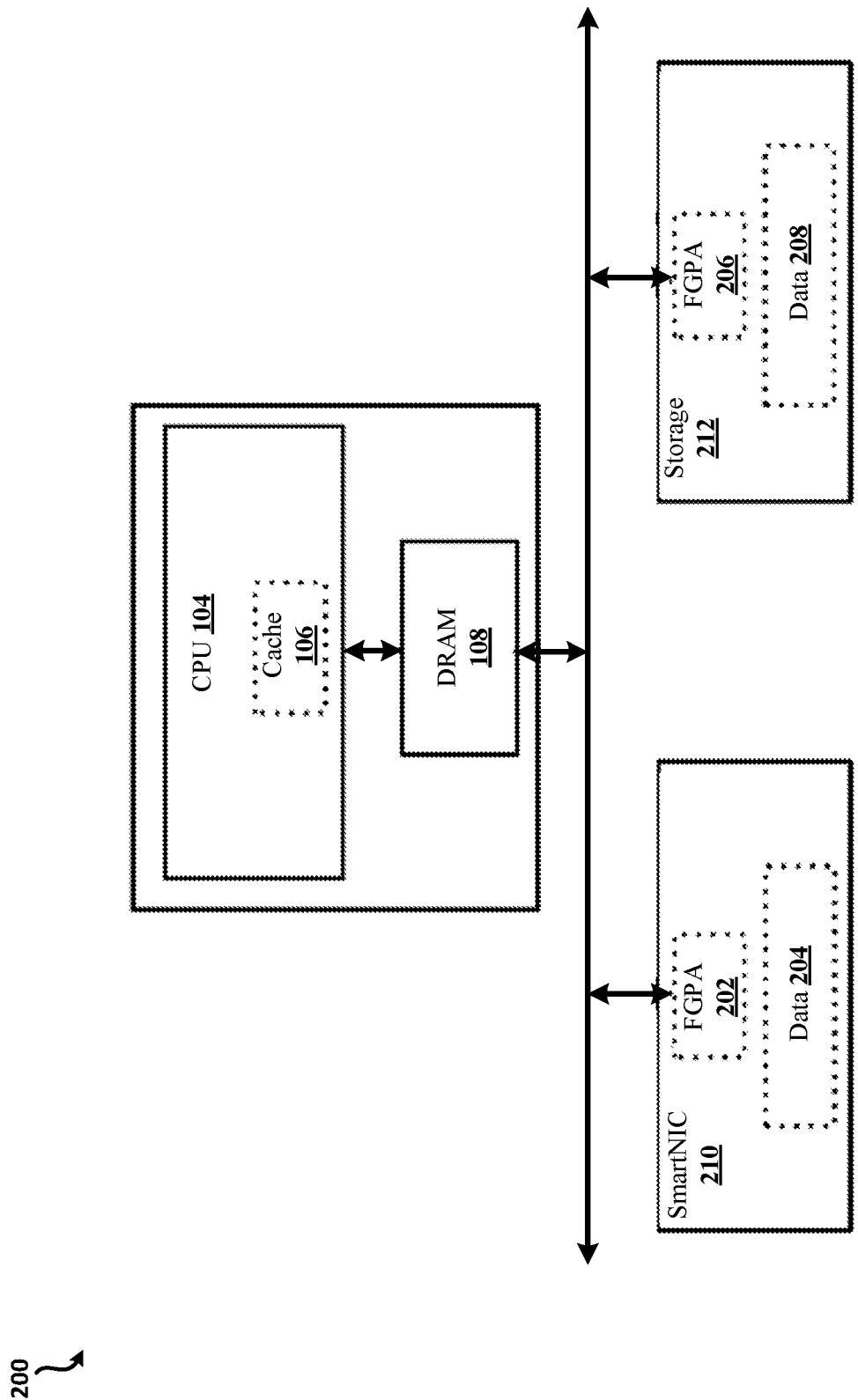
FIG. 2 illustrates another prior art framework for data processing.

Persistent storage (e.g., SSD, HDD) is the main space of data in any computing system. As described above with regard to FIG. 1, moving data between the storage and the DRAM is the cornerstone drawback of widely used computing paradigms. Generally speaking, data-centric computing or offloading data processing into persistent memory seems to be a promising approach that can increase data processing performance. Such a data-centric computing approach is shown by the framework 200 of FIG. 2. Instead of moving data on the host side, such the data-centric computing approach executes computing inside of a storage device or persistent memory.

Field-programmable gate array (FPGA) technology can implement a flexible way to deliver computing power by means of multiple small cores (i.e., FGPA cores 202, 204) that can execute data processing functionality. FPGAs are semiconductor devices that are based around a matrix of configurable logic blocks (CLBs) connected via programmable interconnects. FPGAs can be reprogrammed to desired application or functionality requirements after manufacturing. This feature distinguishes FPGAs from Application Specific Integrated Circuits (ASICs), which are custom manufactured for specific design tasks.

Currently, computational storage 212 and SmartNIC and/or intelligence processing unit (IPU) 210 are the main directions to offload processing of data 204, 208 into storage space. A SmartNIC is a programmable accelerator that makes data center networking, security and storage efficient and flexible. An IPU is a microprocessor specialized for processing machine learning workloads. However, this approach is not transparent and is not easy to manage.

Figure 3:
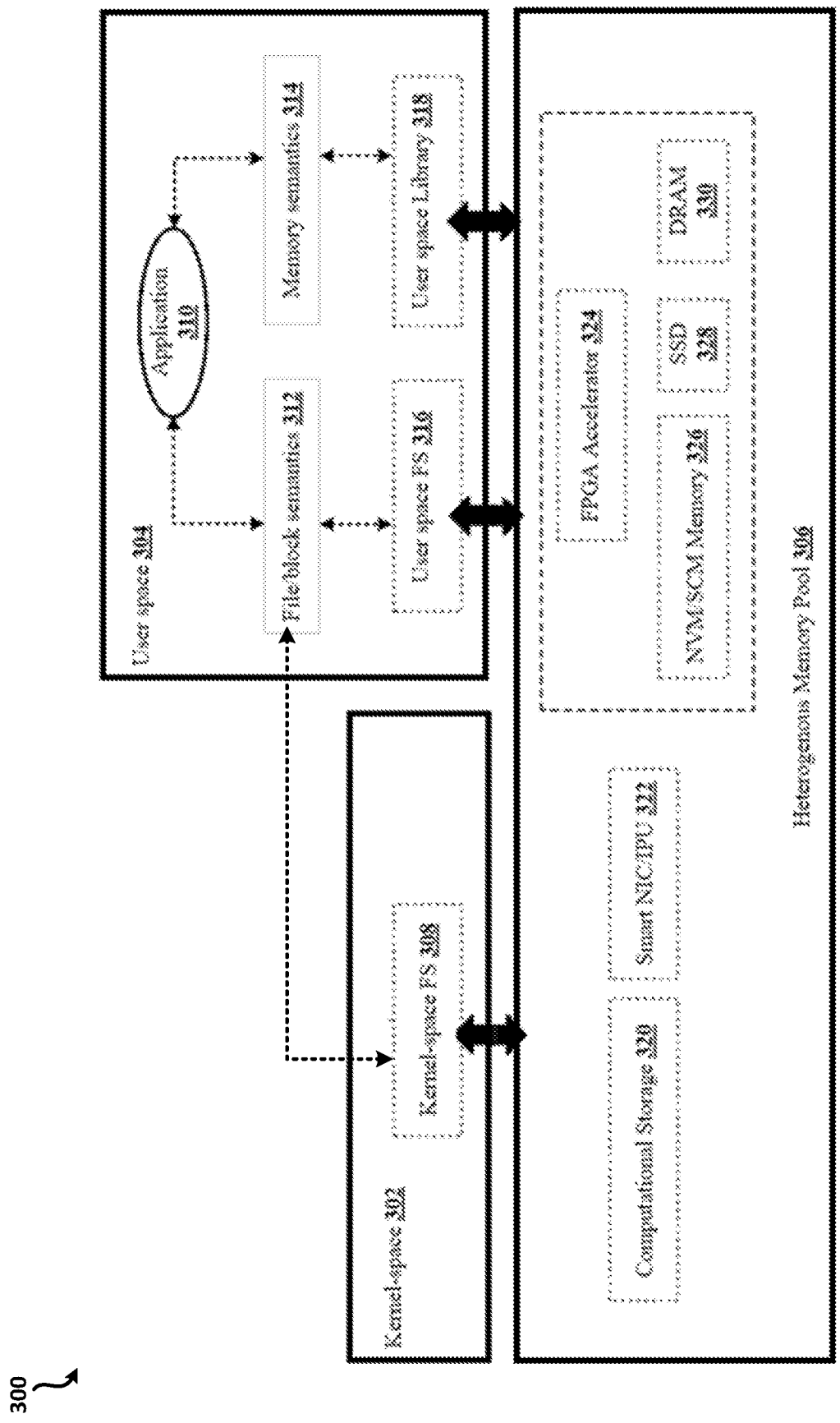
FIG. 3 illustrates an exemplary framework for data processing using a heterogeneous memory pool in accordance with the present disclosure.

FIG. 3 shows a framework 300 for improved data processing. The framework 300 includes a modern computer operating system with virtual memory that is segregated into a kernel space 302 and a user space 304. The kernel space 302 may be reserved for running a privileged operating system kernel, kernel extensions, and most device drivers. A kernel space filesystem (FS) 308 may be running in the kernel space 302. The kernel space FS 308 is part of the operating system and defines an interface between the operating system and the computer's storage devices.

The user space 304 may be reserved for running an application 310. The user space 304 may include any or all code that runs outside the operating system's kernel. The user space 304 may include a user space FS 316. As used herein, user space 304 may refer to the various programs and libraries (e.g., user space library 318) that the operating system uses to interact with the kernel space 302, such as software that performs input/output, manipulates file system objects, application software, etc.

The framework 300 includes a heterogeneous memory pool 306. The heterogeneous memory pool 306 includes embedded computation that provides a more flexible, transparent, and easy to manage solution than existing data processing techniques. The embedded computation may include a non-volatile memory (NVM)/storage-class memory (SCM) 326, a solid-state drive (SSD) 328, a DRAM 330, and/or a FPGA accelerator 324. The heterogeneous memory pool 306 includes a computational storage 320 and a SmartNIC/IPU 322.

The heterogeneous memory pool 306 may be configured to provide memory as file/block semantics 312. As a result, the application 310 can define what semantics (memory semantics 314 or file semantics 312) are more suitable for a logic of data processing. The application 310 may be configured to define what computation should be offloaded into the storage space and what should be still executed by CPU itself. Generally speaking, the goal of the heterogeneous memory pool 306 with embedded computation is to create the collaboration of CPU cores with embedded FPGA cores by achieving much better performance and efficiency. Data is stored into persistent storage space and the application 310 by means of CPU cores simply needs to initiate/manage the data processing by means of FPGA cores near the persistent memory instead of moving data into the CPU cores for processing.

The heterogeneous memory pool 306 contains DRAM 330 as persistent memory (however, it is possible to use other various types of NVM memory, such as fast NVM memory instead of DRAM). Persistent memory provides a way to store and/or keep data persistently in the heterogeneous memory pool. Thus, data can be stored into persistent memory of the heterogeneous memory pool in advance. As the data are already stored in the persistent memory, then the data do not need to be moved in the host's DRAM because data processing can be done by FPGA core(s) near the persistent memory of the heterogeneous memory pool.

Executable code may additionally be stored into persistent memory. The logic of the FPGA core(s) can additionally be stored into persistent memory. The host can simply send a request to process data on the heterogeneous memory pool side. For example, the host can send a request to the heterogeneous memory pool by means of packet NVMe or any other suitable interchange protocol.

The request may define a data type and an algorithm ID. In response, the heterogeneous memory pool may: (1) identify instances of data for the requested data type, (2) synthesize the FPGA core's logic by means of loading executable code from persistent memory into FPGA, (3) execute the multi-core FPGA logic for all data instances, (4) inform the host about the completion of the operation. As a result, the host needs only to retrieve/access the result of the data processing from the heterogeneous memory pool 306.

Figure 4:
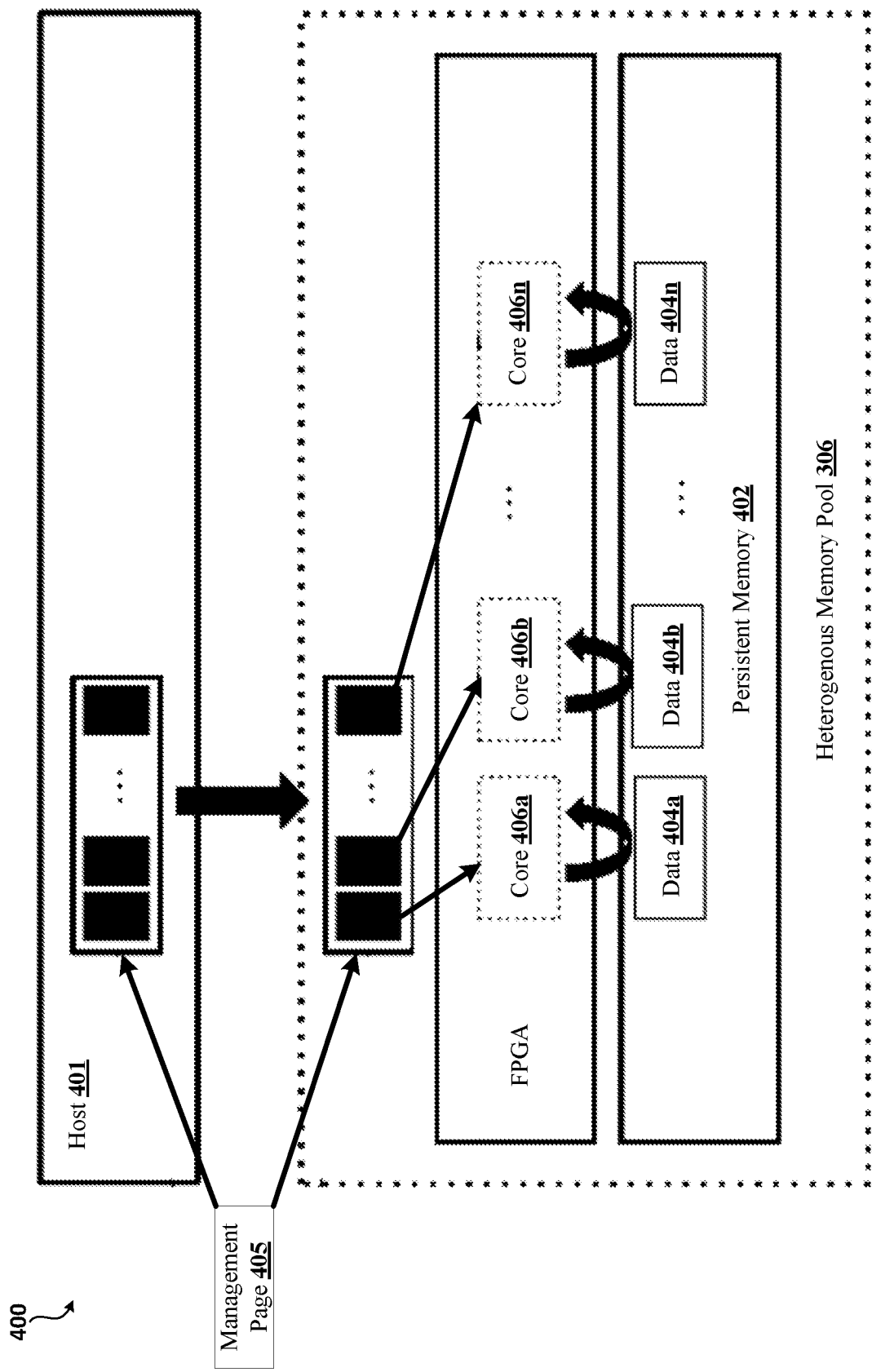
FIG. 4 illustrates an exemplary diagram illustrating a management model of offload computation in accordance with the present disclosure.

FIG. 4 shows an exemplary diagram 400 illustrating a management model of offload computation. Offload computation involves the transfer of resource intensive computational tasks to a separate processor, such as a hardware accelerator, or an external platform, such as a cluster, grid, or a cloud. Offloading to a coprocessor can be used to accelerate applications. Offloading computing to an external platform over a network can provide computing power and overcome hardware limitations of a device, such as limited computational power, storage, and energy.

One of the important advantages of the heterogeneous memory pool 306 is its capability to introduce a memory semantics for the host 401. In this manner, memory semantics can be used for data access and for management of computation activity inside of the heterogeneous memory pool by the host/application 401. In embodiments, the heterogeneous memory pool 306 can expose, on the host side, a special memory address range that is dedicated to management of computation activity inside of the pool. The data space can be imagined like a sequence of data memory pages 404*a-n* with dedicated FPGA cores 406*a-n*. Oppositely, the management space may be a sequence of memory pages that contain management structures. Every memory page can contain several management structures (for example, 4K page can contain 64 management structures 64 bytes in size) and every management structure can manage one pair of an FPGA core and a data memory page.

In embodiments, the host 401 needs to prepare management memory page(s) 405 that define data instances, algorithms, and a computational environment. The write operation of the management page 405 from the host 410 into the heterogeneous memory pool 306 initiates the computation inside of the heterogeneous memory pool 306 by means of selection data memory pages, synthesis of FPGA cores 406*a-n* and parallel execution of multiple algorithms on multiple FPGA cores 406*a-n*.

In this manner, data does not need to be moved from the persistent memory on the host side for processing, the host 401 is able to initiate data processing by many cores 406*a-n* by preparing several management data structures in one memory page, the host 401 does not need to send code on the heterogeneous memory pool side because FPGA core logic is loaded from persistent memory 402 on the pool side, and the host 401 does not need to waste resources managing the data processing execution because the whole process will be hidden inside of the heterogeneous memory pool 306.

Figure 5:
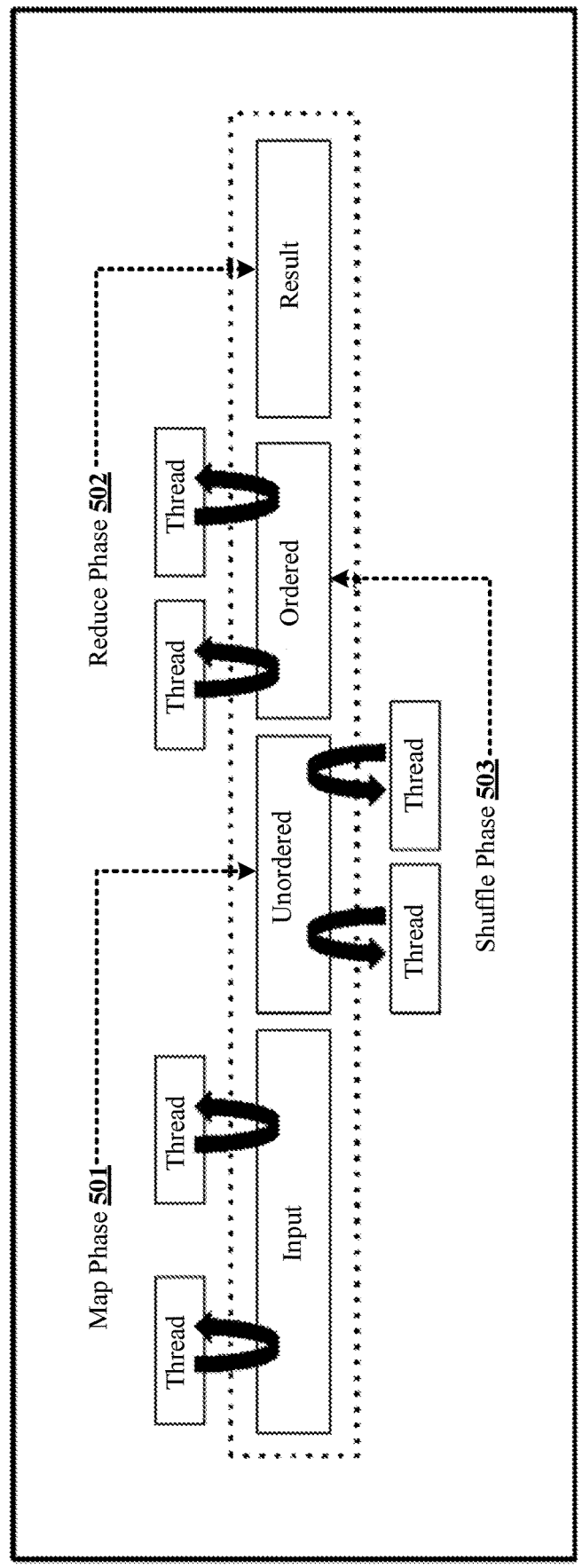
FIG. 5 illustrates an exemplary diagram illustrating a heterogeneous memory pool being used to efficiently implement a MapReduce-like model in accordance with the present disclosure.

In embodiments, as shown by the framework 500 depicted in FIG. 5, a heterogeneous memory pool can be used to efficiently implement a MapReduce like model. MapReduce is a programming model and an associated implementation for processing and generating big data sets with a parallel, distributed algorithm on a cluster. MapReduce is approach that includes three stages: a map phase 501 which performs filtering and sorting, a shuffle phase 503 which includes the process of transferring data from the mappers to the reducers, and a reduce phase 502 which performs a summary operation.

The map phase 501 involves splitting an input stream amongst many threads with the goal to extract key-value pairs. For example, during the map phase 501, each worker node applies the map function to the local data and writes the output to a temporary storage. A master node ensures that only one copy of the redundant input data is processed. The map phase 501 may finish with unordered sequence of key-value pairs as a result.

The responsibility of the shuffle phase 503 may be to sort the key-value pairs by multiple threads. For example, during the shuffle phase 503, worker nodes redistribute data based on the output keys (produced by the map function), such that all data belonging to one key is located on the same worker node. Finally, the reduce phase 502 may select the key-value pairs that satisfy some condition. For example, during the reduce phase 502, worker nodes may process each group of output data, per key, in parallel.

MapReduce allows for the distributed processing of the map and reduction operations. Maps can be performed in parallel, provided that each mapping operation is independent of the others; in practice, this is limited by the number of independent data sources and/or the number of CPUs near each source. Similarly, a set of 'reducers' can perform the reduction phase, provided that all outputs of the map operation that share the same key are presented to the same reducer at the same time, or that the reduction function is associative. MapReduce can be applied to significantly larger datasets than a single "commodity" server can handle. The parallelism also offers some possibility of recovering from partial failure of servers or storage during the operation. For example, if one mapper or reducer fails, the work can be rescheduled—assuming the input data are still available.

Thus, the heterogeneous memory pool can efficiently execute the MapReduce model by means of offloading the entire data processing activity inside of the heterogeneous memory pool in a massively parallel manner. Massively parallel processing is a storage structure designed to handle the coordinated processing of program operations by multiple processors. This coordinated processing can work on different parts of a program, with each processor using its own operating system and memory. This allows massively parallel processing databases to handle massive amounts of data and provide much faster analytics based on large datasets. For example, massively parallel processing processors can have up to 200 or more processors working on application and most commonly communicate using a messaging interface.

Figure 6:
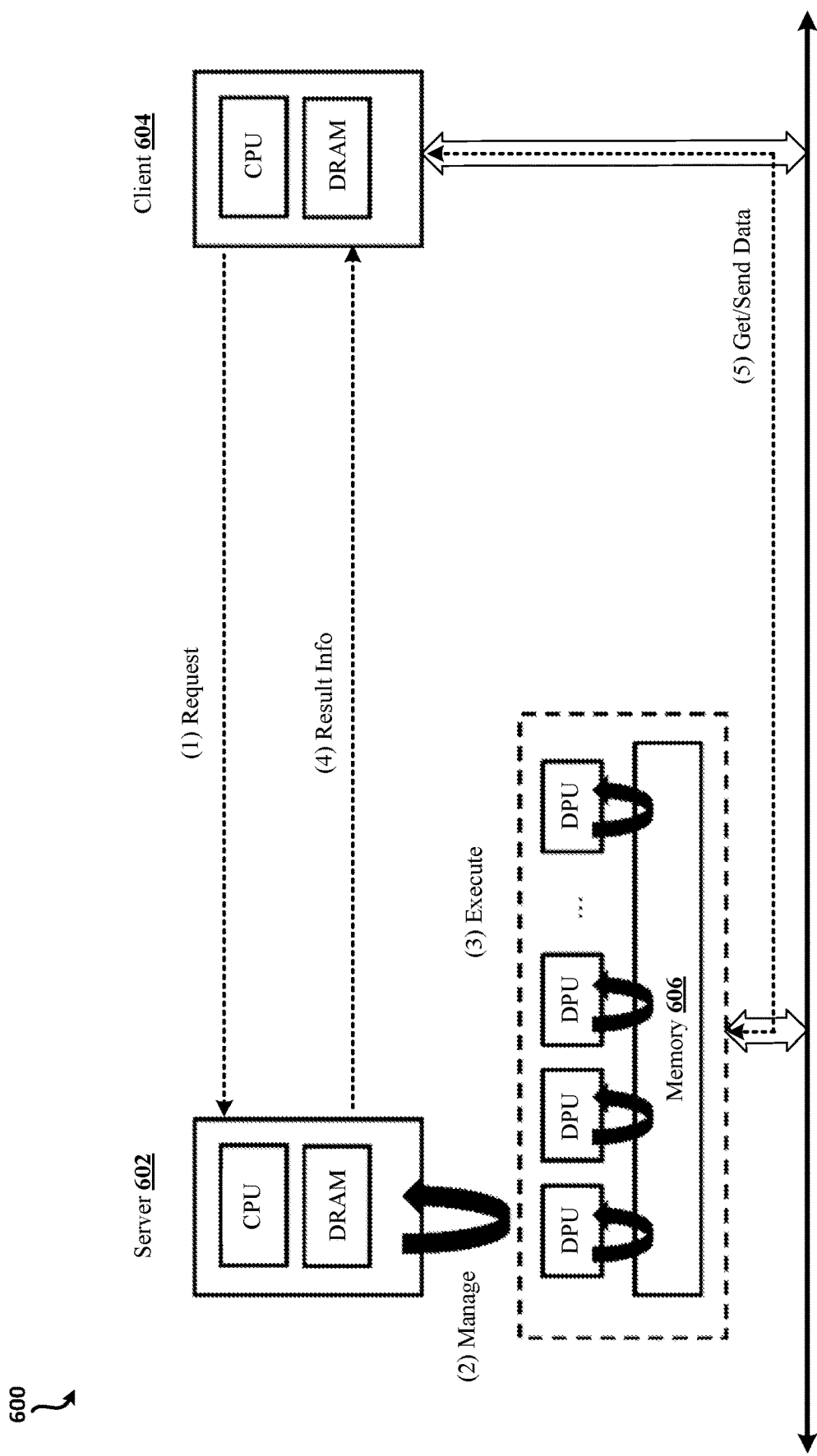
FIG. 6 illustrates an exemplary diagram illustrating a heterogeneous memory pool being used to efficiently implement a database model in accordance with the present disclosure.

In embodiments, as shown by the framework 600 depicted in FIG. 6, a database use-case is another example to employ the management model of offload computation with high efficiency. A database management system may be based on client-server architecture. Thus, the client 604 first sends SQL requests on the server side to the server. The responsibility of server 602 is to execute the received SQL requests with the goal to service many clients. Execution of SQL requests can be offloaded into the heterogeneous memory pool 606 by means of using the management model of computation offload.

The key advantage is the distribution of the data processing load among many FPGA cores inside of the persistent memory space. As a result, the performance of data processing can be significantly enhanced because data does not need to be moved into the DRAM of the host and due to massively parallel data processing facilitated by multiple FPGA cores.

Figure 7:
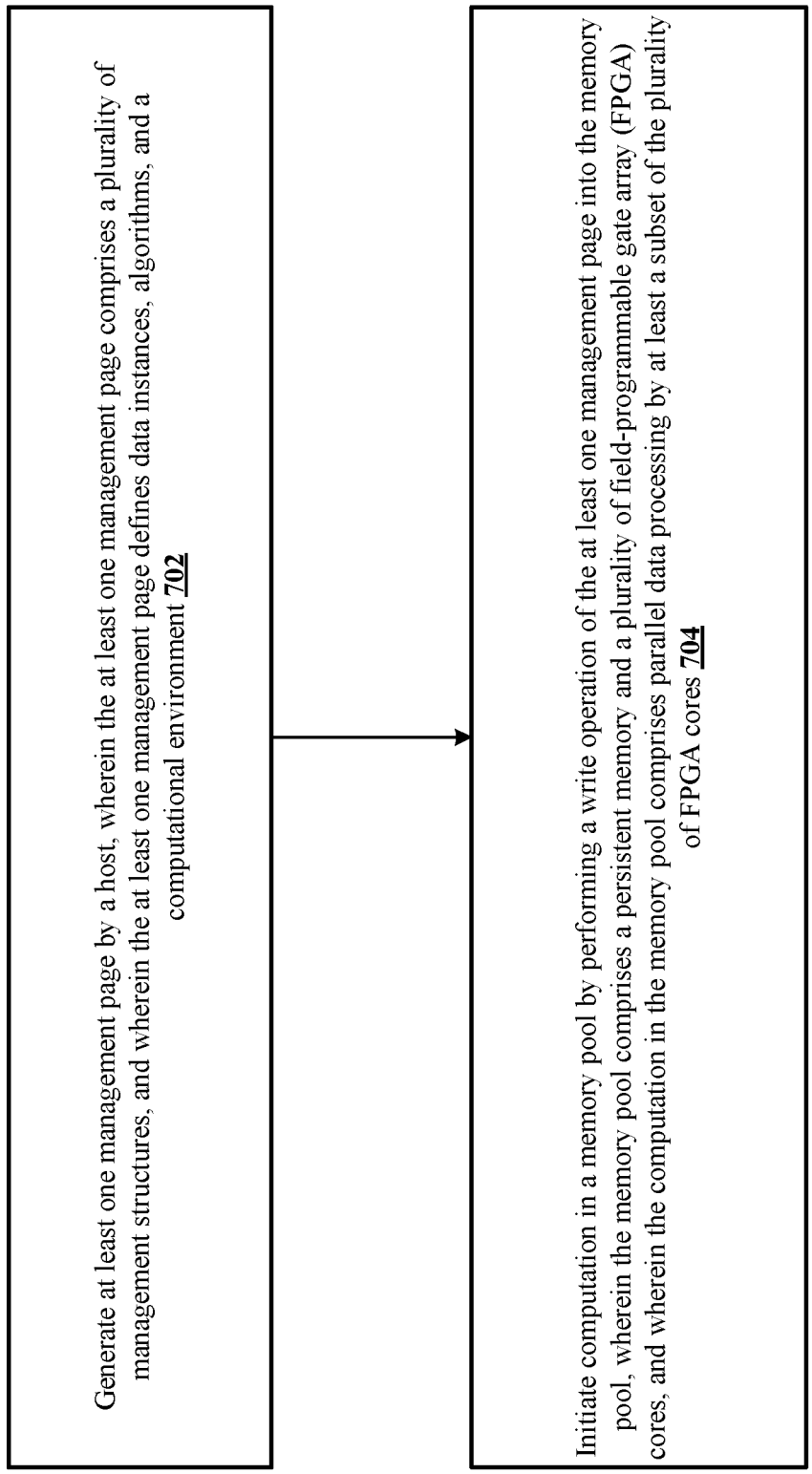
FIG. 7 illustrates an example process for data processing using a heterogeneous memory pool in accordance with the present disclosure.

FIG. 7 illustrates an example process 700 performed by one or more components shown in the diagram 300. For example, the process 700 may be performed, at least in part, by a framework for data processing using a heterogeneous memory pool. The process 700 may be performed to process data in an improved manner. Although depicted as a sequence of operations in FIG. 7, those of ordinary skill in the art will appreciate that various embodiments may add, remove, reorder, or modify the depicted operations.

As described above, a host may prepare a management memory page (i.e., management page 405) that defines data instances, algorithms, and/or a computational environment. At 702, at least one management page may be generated by a host. The at least one management page may comprise a plurality of management structures, and the at least one management page may define data instances, algorithms, and/or a computational environment.

The management page may be written into a heterogeneous memory pool that is configured to initiate the computation inside of the heterogeneous memory pool by means of selecting data memory pages, synthesis of FPGA cores (i.e., FPGA cores 406*a-n*) and parallel execution of multiple algorithms on multiple FPGA cores.

At 704, computation may be initiated in a heterogeneous memory pool by performing a write operation of the at least one management page into the heterogeneous memory pool. The heterogeneous memory pool may comprise a persistent memory and a plurality of FPGA cores. The computation in the heterogeneous memory pool may comprise parallel data processing by at least a subset of the plurality of FPGA cores.

In this manner, data does not need to be moved from the persistent memory on the host side for processing, the host may be able to initiate data processing by many cores by preparing several management data structures in one memory page, the host does not need to send code on the heterogeneous memory pool side because FPGA core logic is loaded from persistent memory on the pool side, and the host does not need to waste resources managing the data processing execution because the whole process will be hidden inside of the heterogeneous memory pool.

Figure 8:
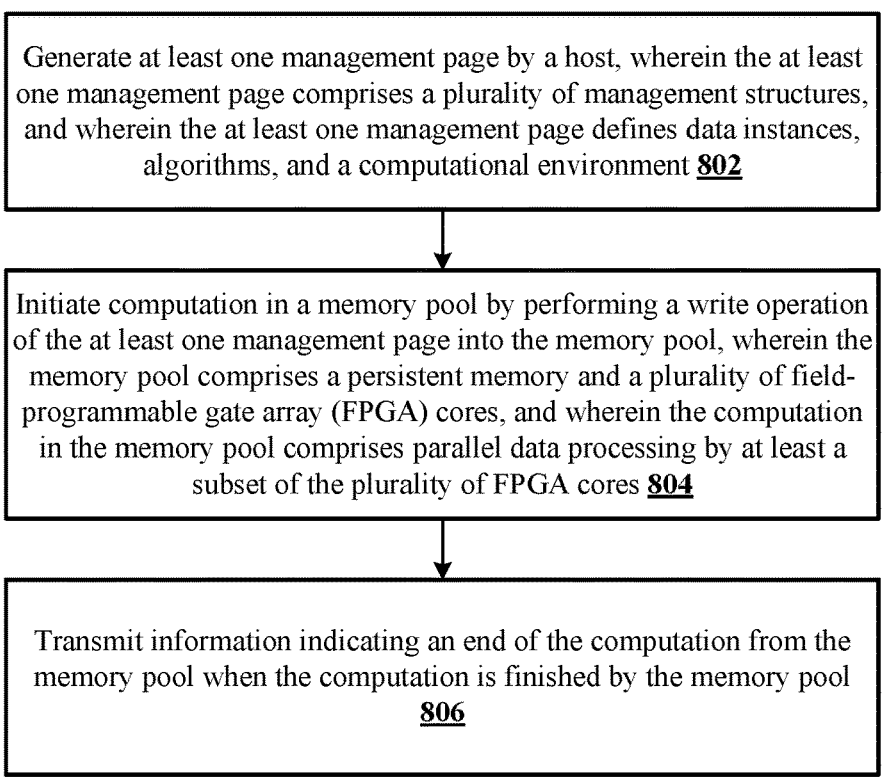
FIG. 8 illustrates another example process for data processing using a heterogeneous memory pool in accordance with the present disclosure.

FIG. 8 illustrates an example process 800 performed by one or more components shown in the diagram 300. For example, the process 800 may be performed, at least in part, by a framework for data processing using a heterogeneous memory pool. The process 800 may be performed to process data in an improved manner. Although depicted as a sequence of operations in FIG. 8, those of ordinary skill in the art will appreciate that various embodiments may add, remove, reorder, or modify the depicted operations.

As described above, a host may prepare a management memory page (i.e., management page 405) that defines data instances, algorithms, and/or a computational environment. At 802, at least one management page may be generated by a host. The at least one management page may comprise a plurality of management structures, and the at least one management page may define data instances, algorithms, and/or a computational environment.

The management page may be written into a heterogeneous memory pool that is configured to initiate the computation inside of the heterogeneous memory pool by means of selection data memory pages, synthesis of FPGA cores (i.e., FPGA cores 406a-n) and parallel execution of multiple algorithms on multiple FPGA cores.

At 804, computation may be initiated in a heterogeneous memory pool by performing a write operation of the at least one management page into the heterogeneous memory pool. The heterogeneous memory pool may comprise a persistent memory and a plurality of FPGA cores. The computation in the heterogeneous memory pool may comprise parallel data processing by at least a subset of the plurality of FPGA cores.

In this manner, data does not need to be moved from the persistent memory on the host side for processing, the host may be able to initiate data processing by many cores by preparing several management data structures in one memory page, the host does not need to send code on the heterogeneous memory pool side because FPGA core logic is loaded from persistent memory on the pool side, and the host does not need to waste resources managing the data processing execution because the whole process will be hidden inside of the heterogeneous memory pool.

The heterogeneous memory pool may, after executing the multi-core FPGA logic for all data instances, inform the host about the completion of the operation. At 806, information indicating an end of the computation may be transmitted from the heterogeneous memory pool when the computation is finished by the heterogeneous memory pool. As a result, the host needs only to retrieve/access the result of the data processing from the heterogeneous memory pool.

Figure 9:
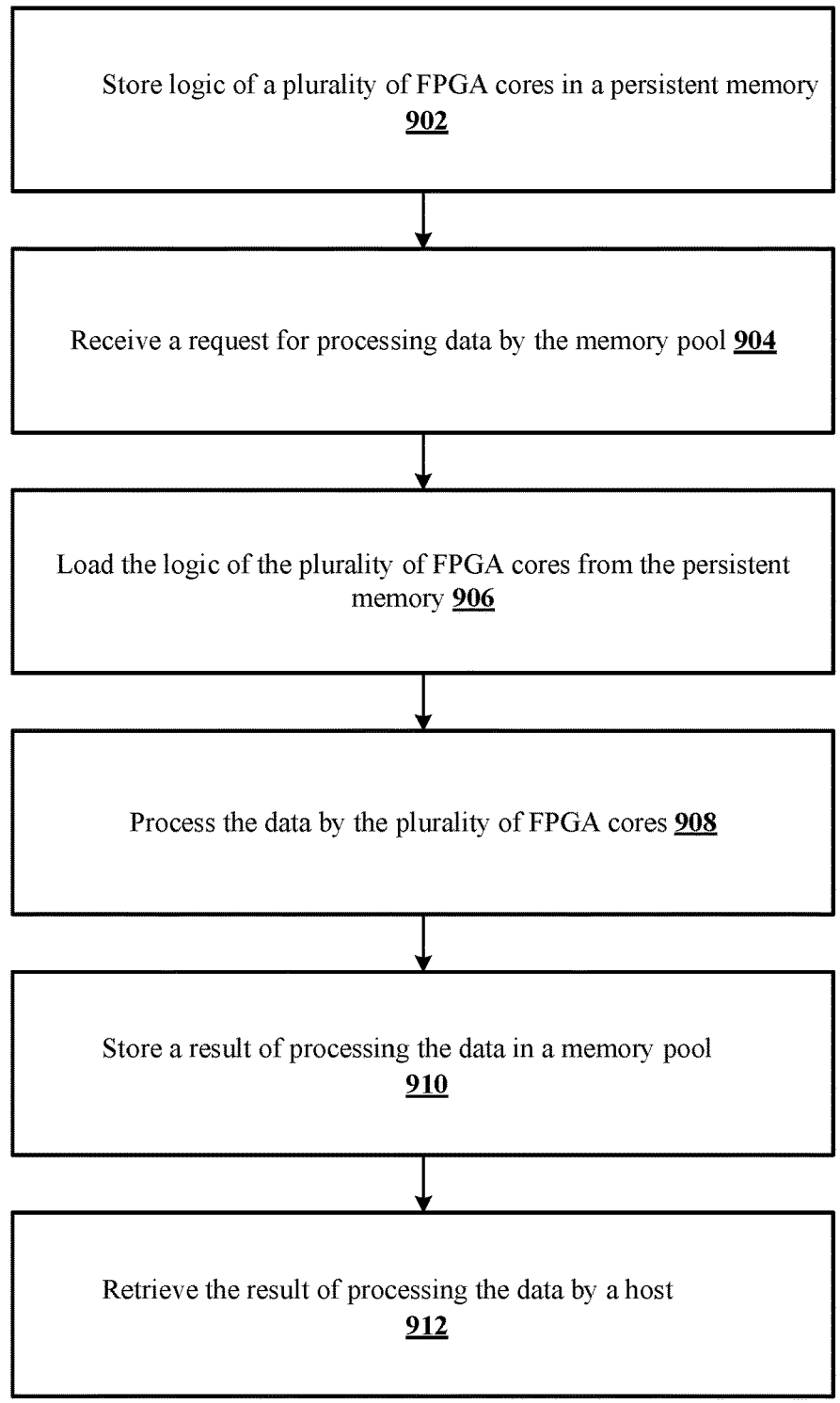
FIG. 9 illustrates another example process for data processing using a heterogeneous memory pool in accordance with the present disclosure.

FIG. 9 illustrates an example process 900 performed by one or more components shown in the diagram 300. For example, the process 900 may be performed, at least in part, by a framework for data processing using a heterogeneous memory pool. The process 900 may be performed to process data in an improved manner. Although depicted as a sequence of operations in FIG. 9, those of ordinary skill in the art will appreciate that various embodiments may add, remove, reorder, or modify the depicted operations.

As described above, a heterogeneous memory pool may contain DRAM as persistent memory (but fast NVM memory can be used instead of DRAM). Persistent memory provides a way to store and/or keep data persistently in the heterogeneous memory pool. Thus, data can be stored into persistent memory of heterogeneous memory pool in advance. As the data are already stored in the persistent memory, then the data do not need to be moved in the host's DRAM because data processing can be done by FPGA core(s) near the persistent memory of heterogeneous memory pool.

Executable code may additionally be stored into persistent memory. The logic of the FPGA core(s) can additionally be stored into persistent memory. At 902, logic of a plurality of FPGA cores may be stored in the persistent memory.

Thus, the host can simply send a request to process data on the heterogeneous memory pool side (for example, by means of packet NVMe or any other interchange protocol). The request may define a data type and an algorithm ID. The host may, for example, sent the request to the heterogeneous memory pool. The heterogeneous memory pool may receive the request.

At 904, a request for processing data may be received by the heterogeneous memory pool. In response to receiving the request, the heterogeneous memory pool may identify instances of data for the requested data type. The heterogeneous memory pool may next synthesize the FPGA core's logic by means of loading executable code from persistent memory into FPGA. At 906, the logic of the plurality of FPGA cores may be loaded from the persistent memory.

The heterogeneous memory pool may next execute the multi-core FPGA logic for all data instances. At 908, the data may be processed by the plurality of FPGA cores. The heterogeneous memory pool may cause the result of processing the data to be stored in the heterogeneous memory pool.

Figure 10:
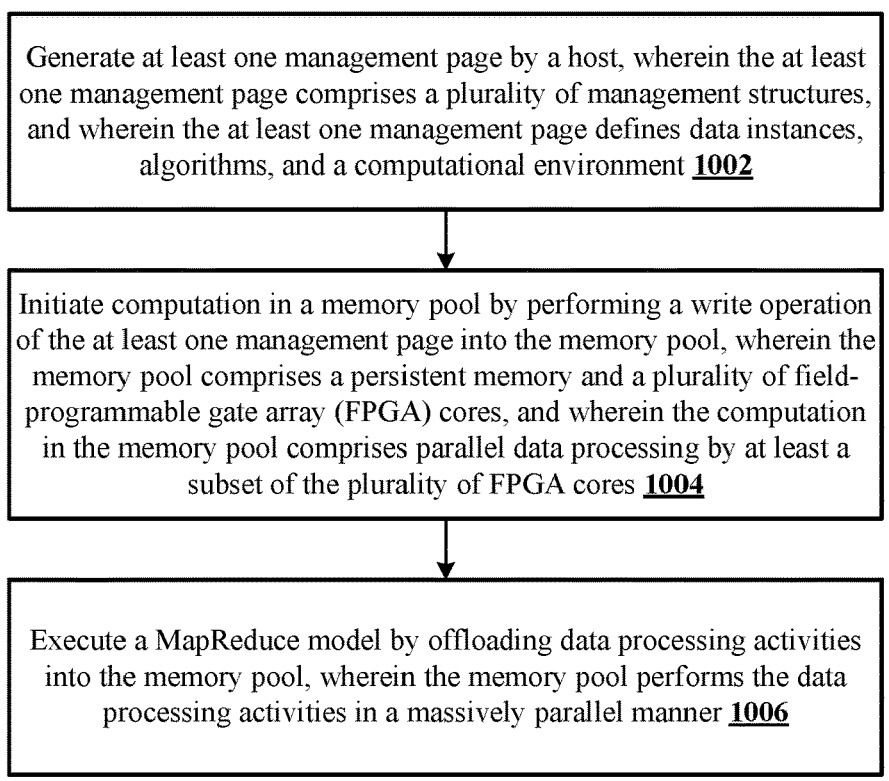
FIG. 10 illustrates another example process for data processing using a heterogeneous memory pool in accordance with the present disclosure.

At 910, a result of processing the data may be stored in the memory pool. The heterogeneous memory pool may then inform the host about the completion of the operation. In response to being informed about the completion of the operation, the host may then retrieve or access the result of the data processing from the heterogeneous memory pool. At 912, the result of processing the data may be retrieved by a host FIG. 10 illustrates an example process 1000 performed by one or more components shown in the diagram 300. For example, the process 1000 may be performed, at least in part, by a framework for data processing using a heterogeneous memory pool. The process 1000 may be performed to process data in an improved manner. Although depicted as a sequence of operations in FIG. 10, those of ordinary skill in the art will appreciate that various embodiments may add, remove, reorder, or modify the depicted operations.

As described above, a host may prepare a management memory page (i.e., management page 405) that defines data instances, algorithms, and/or a computational environment. At 1002, at least one management page may be generated by a host. The at least one management page may comprise a plurality of management structures, and the at least one management page may define data instances, algorithms, and/or a computational environment.

The management page may be written into a heterogeneous memory pool that is configured to initiate the computation inside of the heterogeneous memory pool by means of selection data memory pages, synthesis of FPGA cores (i.e., FPGA cores 406*a-n*) and parallel execution of multiple algorithms on multiple FPGA cores.

At 1004, computation may be initiated in a heterogeneous memory pool by performing a write operation of the at least one management page into the memory pool. The memory pool may comprise a persistent memory and a plurality of FPGA cores. The computation in the memory pool may comprise parallel data processing by at least a subset of the plurality of FPGA cores.

As described above, a heterogeneous memory pool can be used to efficiently implement a MapReduce like model. MapReduce is approach that includes three stages: a map phase, a shuffle phase, and a reduce phase. The map phase involves splitting an input stream amongst many threads with the goal to extract key-value pairs. The map phase may finish with unordered sequence of key-value pairs as a result.

The responsibility of the shuffle phase may be to sort the key-value pairs by multiple threads. Finally, the reduce phase may select the key-value pairs that satisfy some condition. At 1006, a MapReduce model may be executed by offloading data processing activities into the heterogeneous memory pool. The heterogeneous memory pool may perform the data processing activities in a massively parallel manner.

Figure 11:
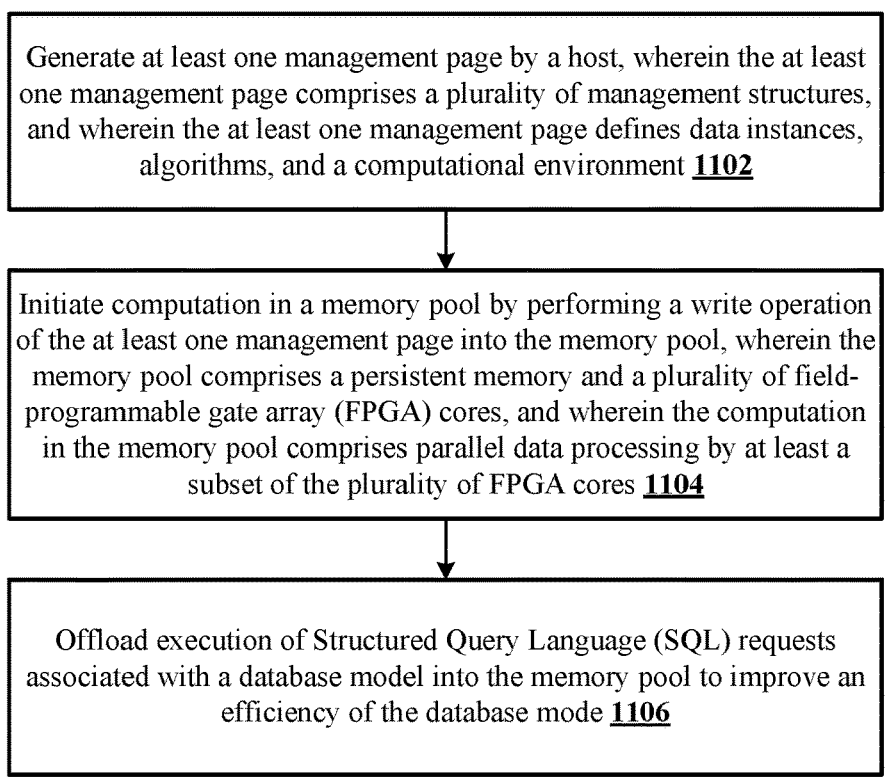
FIG. 11 illustrates another example process for data processing using a heterogeneous memory pool.

FIG. 11 illustrates an example process 1100 performed by one or more components shown in the diagram 300. For example, the process 1100 may be performed, at least in part, by a framework for data processing using a heterogeneous memory pool. The process 1100 may be performed to process data in an improved manner. Although depicted as a sequence of operations in FIG. 11, those of ordinary skill in the art will appreciate that various embodiments may add, remove, reorder, or modify the depicted operations.

As described above, a host may prepare a management memory page (i.e., management page 405) that defines data instances, algorithms, and/or a computational environment. At 1102, at least one management page may be generated by a host. The at least one management page may comprise a plurality of management structures, and the at least one management page may define data instances, algorithms, and/or a computational environment.

The management page may be written into a heterogeneous memory pool that is configured to initiate the computation inside of the heterogeneous memory pool by means of selection data memory pages, synthesis of FPGA cores (i.e., FPGA cores 406*a-n*) and parallel execution of multiple algorithms on multiple FPGA cores.

At 1104, computation may be initiated in a heterogeneous memory pool by performing a write operation of the at least one management page into the memory pool. The heterogeneous memory pool may comprise a persistent memory and a plurality of FPGA cores. The computation in the heterogeneous memory pool may comprise parallel data processing by at least a subset of the plurality of FPGA cores.

As described above, a database use-case is another example to employ the management model of offload computation with high efficiency. A database management system may be based on client-server architecture. Thus, the client first sends SQL requests on the server side to the server. The responsibility of server is to execute the received SQL requests with the goal to service many clients. Execution of SQL requests can be offloaded into the heterogeneous memory pool by means of using the management model of computation offload. At 1106, execution of Structured Query Language (SQL) requests associated with a database model may be offloaded into the heterogeneous memory pool to improve an efficiency of the database mode.

The key advantage is the distribution of the data processing load among many FPGA cores inside of the persistent memory space. As a result, the performance of data processing can be significantly enhanced because data does not need to be moved into the DRAM of the host and due to massively parallel data processing facilitated by multiple FPGA cores.

The techniques described herein may facilitate the efficient and flexible management mechanism of data processing offload into persistent memory space. Additionally, the techniques described herein may significantly enhance data processing performance by means of massively parallel data processing by multiple FPGA cores. Utilizing the techniques described herein may save CPU resources by delegating data processing to multiple FPGA cores. Other benefits provided by the techniques described herein may include excluding the necessity to move data into the host's DRAM for processing and/or excluding the necessity to deliver the code from the host side to execute data processing. As described above, the techniques described herein may additionally enhance MapReduce model efficiency. The techniques described herein may additionally significantly improve the performance of database operations in a client-server model.

For example, utilizing the techniques described herein for data processing may prevent the need to move data from persistent memory on the host side for processing. Additionally, the host may be able to initiate data processing by many cores by means of preparing several management data structures in one memory page. The host does not need to send code on the heterogeneous memory pool side because FPGA core logic is loaded from persistent memory on the heterogeneous memory pool side. Additionally, the host does not need to waste resources managing the data processing execution because the entire process will be hidden inside of the heterogeneous memory pool.

Figure 12:
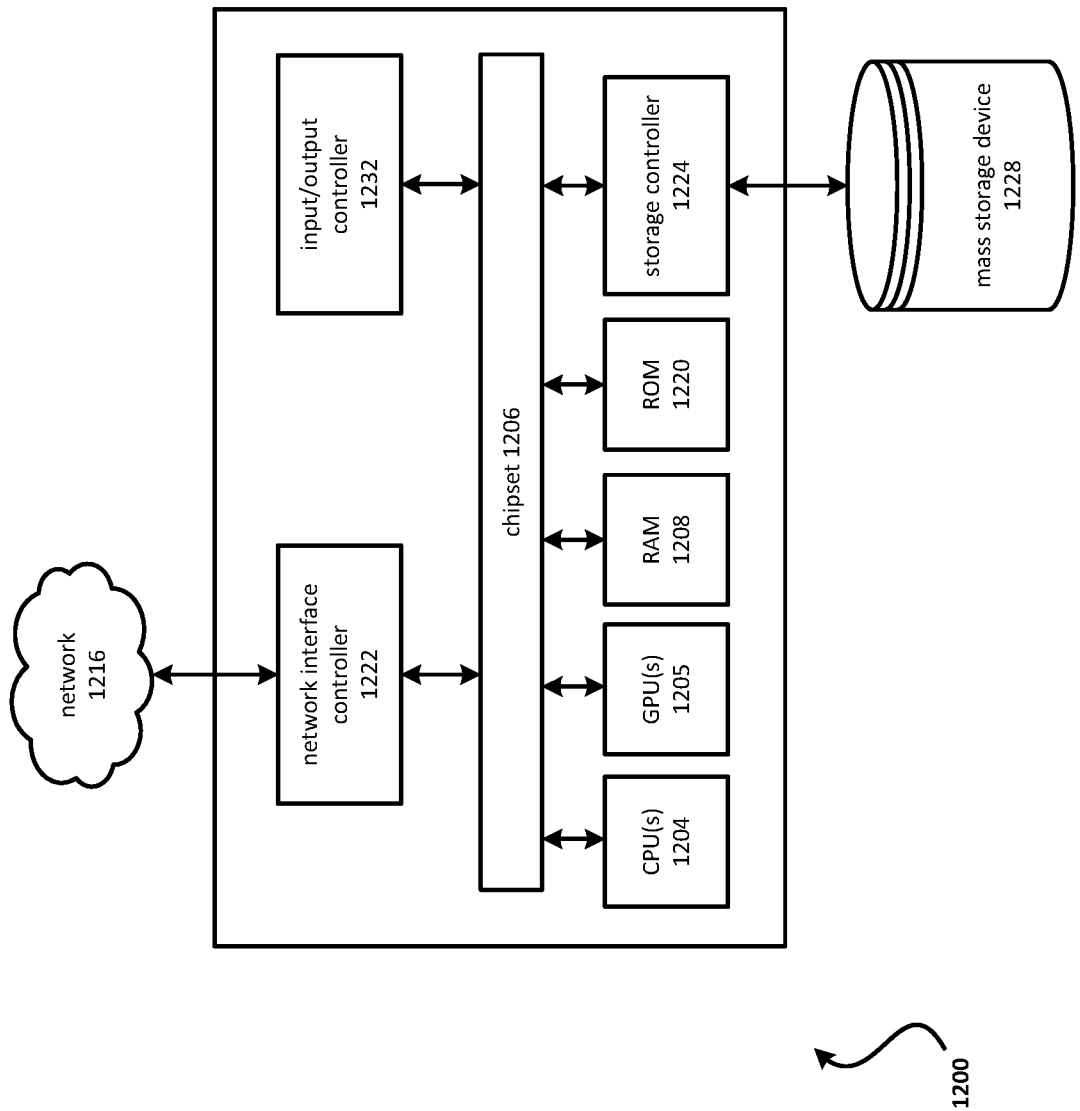
FIG. 12 illustrates an example computing device which may be used to perform any of the techniques disclosed herein.

FIG. 12 illustrates a computing device that may be used in various aspects, such as the services, networks, modules, and/or devices depicted in FIGS. 1-6. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1212. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate.

For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving data processing performance, comprising:
   generating at least one management page by a host, wherein the at least one management page comprises a plurality of management structures, and wherein the at least one management page defines data instances, algorithms, and a computational environment; and
   initiating computation in a memory pool by performing a write operation of the at least one management page into the memory pool, wherein the memory pool comprises a persistent memory and a plurality of field-programmable gate array (FPGA) cores, and wherein the computation in the memory pool comprises parallel data processing by at least a subset of the plurality of FPGA cores.

2. The method of claim 1, wherein the memory pool comprises a plurality of data memory pages of storing data, and the plurality of data memory pages correspond to the plurality of FPGA cores.

3. The method of claim 2, wherein each of the plurality of management structures is configured to manage a pair of a data memory page and a corresponding FPGA core, the data memory page is among the plurality of data memory pages, and the corresponding FPGA core is among the plurality of FPGA cores.

4. The method of claim 2, wherein the initiating computation in a memory pool further comprising:
   identifying at least a subset of the plurality of data memory pages; and
   loading executable codes from the persistent memory into the at least a subset of the plurality of FPGA cores.

5. The method of claim 1, further comprising:
   transmitting information indicating an end of the computation from the memory pool when the computation is finished by the memory pool.

6. The method of claim 1, further comprising:
   storing logic of the plurality of FPGA cores in the persistent memory.

7. The method of claim 6, further comprising:
   receiving a request for processing data by the memory pool;
   loading the logic of the plurality of FPGA cores from the persistent memory; and
   processing the data by the plurality of FPGA cores.

8. The method of claim 7, further comprising:
   storing a result of processing the data in the memory pool; and
   retrieving the result of processing the data by the host.

9. The method of claim 1, further comprising:
   executing a MapReduce model by offloading data processing activities into the memory pool, wherein the memory pool performs the data processing activities in a massively parallel manner.

10. The method of claim 1, further comprising:
    offloading execution of Structured Query Language (SQL) requests associated with a database model into the memory pool to improve an efficiency of the database model.

11. A system of improving data processing performance, comprising:
    at least one processor; and
    at least one memory comprising computer-readable instructions that upon execution by the at least one processor cause the system to perform operations comprising:
    generating at least one management page by a host, wherein the at least one management page comprises a plurality of management structures, and wherein the at least one management page defines data instances, algorithms, and a computational environment; and
    initiating computation in a memory pool by performing a write operation of the at least one management page into the memory pool, wherein the memory pool comprises a persistent memory and a plurality of field-programmable gate array (FPGA) cores, and wherein the computation in the memory pool comprises parallel data processing by at least a subset of the plurality of FPGA cores.

12. The system of claim 11, wherein the memory pool comprises a plurality of data memory pages of storing data, and the plurality of data memory pages correspond to the plurality of FPGA cores.

13. The system of claim 12, wherein each of the plurality of management structures is configured to manage a pair of a data memory page and a corresponding FPGA core, the data memory page is among the plurality of data memory pages, and the corresponding FPGA core is among the plurality of FPGA cores.

14. The system of claim 12, wherein the initiating computation in a memory pool further comprises:
   identifying at least a subset of the plurality of data memory pages; and
   loading executable codes from the persistent memory into the at least a subset of the plurality of FPGA cores.

15. The system of claim 11, the operations further comprising:
   receiving a request for processing data by the memory pool;
   loading logic of the plurality of FPGA cores from the persistent memory; and
   processing the data by the plurality of FPGA cores.

16. A non-transitory computer-readable storage medium, storing computer-readable instructions that upon execution by a processor cause the processor to implement operations, the operations comprising:
   generating at least one management page by a host, wherein the at least one management page comprises a plurality of management structures, and wherein the at least one management page defines data instances, algorithms, and a computational environment; and
   initiating computation in a memory pool by performing a write operation of the at least one management page into the memory pool, wherein the memory pool comprises a persistent memory and a plurality of field-programmable gate array (FPGA) cores, and wherein the computation in the memory pool comprises parallel data processing by at least a subset of the plurality of FPGA cores.

17. The non-transitory computer-readable storage medium of claim 16, wherein the memory pool comprises a plurality of data memory pages of storing data, and the plurality of data memory pages correspond to the plurality of FPGA cores.

18. The non-transitory computer-readable storage medium of claim 17, wherein each of the plurality of management structures is configured to manage a pair of a data memory page and a corresponding FPGA core, the data memory page is among the plurality of data memory pages, and the corresponding FPGA core is among the plurality of FPGA cores.

19. The non-transitory computer-readable storage medium of claim 17, wherein the initiating computation in a memory pool further comprising:
   identifying at least a subset of the plurality of data memory pages; and
   loading executable codes from the persistent memory into the at least a subset of the plurality of FPGA cores.

20. The non-transitory computer-readable storage medium of claim 16, the operations further comprising:
   receiving a request for processing data by the memory pool;
   loading logic of the plurality of FPGA cores from the persistent memory; and
   processing the data by the plurality of FPGA cores.

* * * * *